(12) United States Patent
Singhal

(10) Patent No.: US 8,090,945 B2
(45) Date of Patent: Jan. 3, 2012

(54) SYSTEMS AND METHODS FOR MULTI-FACTOR REMOTE USER AUTHENTICATION

(76) Inventor: Tara Chand Singhal, Torrance, CA (US)

( * ) Notice: Subject to any disclaimer, the term of this patent is extended or adjusted under 35 U.S.C. 154(b) by 329 days.

(21) Appl. No.: 11/520,201

(22) Filed: Sep. 13, 2006

(65) Prior Publication Data

US 2007/0067642 A1    Mar. 22, 2007

Related U.S. Application Data

(60) Provisional application No. 60/717,613, filed on Sep. 16, 2005, provisional application No. 60/729,043, filed on Oct. 21, 2005.

(51) Int. Cl.
*H04L 9/00* (2006.01)
*H04L 9/32* (2006.01)
*G06F 7/04* (2006.01)

(52) U.S. Cl. ........ 713/168; 713/169; 713/170; 713/171; 713/172; 713/174; 726/3; 726/4; 726/5; 726/6; 726/7

(58) Field of Classification Search ....... 726/9; 713/168
See application file for complete search history.

(56) References Cited

U.S. PATENT DOCUMENTS

| | | | |
|---|---|---|---|
| 6,289,450 B1 * | 9/2001 | Pensak et al. | 713/167 |
| 6,330,588 B1 * | 12/2001 | Freeman | 709/202 |
| 6,360,953 B1 * | 3/2002 | Lin et al. | 235/492 |
| 6,641,050 B2 * | 11/2003 | Kelley et al. | 235/492 |
| 6,772,331 B1 * | 8/2004 | Hind et al. | 713/151 |
| 6,948,066 B2 * | 9/2005 | Hind et al. | 713/168 |
| 7,149,309 B1 * | 12/2006 | Silver | 380/229 |

(Continued)

FOREIGN PATENT DOCUMENTS

CH    EP 1271317 A1 *    1/2003

OTHER PUBLICATIONS

International Preliminary Report on Patentability, dated Mar. 26, 2009 for PCT Application PCT/US2006/035991 of Tara Chand Singhal.

(Continued)

*Primary Examiner* — Longbit Chai
(74) *Attorney, Agent, or Firm* — Steve Roeder, Esq.

(57) ABSTRACT

A multi-factor remote user authentication card-device has innovative features that enable this one card-device itself to function and accomplish a multi-factor remote user authentication of "what you know", "what you have", "where you are" and "what you are", to a network. In one embodiments of the card-device, one card-device enables two-factor authentication of "what you have" and "what you are". In another embodiment, one card-device enables two-factor authentication of "what you know" and "what you have". In yet another embodiment, one card-device enables three-factor authentication of "what you know", "what you have", and "what you are". In yet another embodiment, one card-device enables four-factor authentication of "what you know", "what you have", "where you are", and "what you are". The authentication logic dynamically facilitates the use of multi-factor authentication so that it dynamically adjusts what factors are applicable for specific security application enabling a universal remote authentication device.

22 Claims, 16 Drawing Sheets

U.S. PATENT DOCUMENTS

| | | | |
|---|---|---|---|
| 2002/0010679 A1* | 1/2002 | Felsher | 705/51 |
| 2002/0126850 A1* | 9/2002 | Allen et al. | 380/277 |
| 2003/0105964 A1* | 6/2003 | Brainard et al. | 713/178 |
| 2005/0102244 A1* | 5/2005 | Dickinson et al. | 705/74 |
| 2006/0047971 A1* | 3/2006 | Miyazaki et al. | 713/186 |
| 2006/0246682 A1* | 11/2006 | Gebreselasie et al. | 438/424 |
| 2008/0110980 A1* | 5/2008 | Hogg et al. | 235/380 |
| 2008/0222038 A1* | 9/2008 | Eden et al. | 705/44 |

OTHER PUBLICATIONS

Extended European Search Report, dated Apr. 6, 2011 for PCT Application PCT/US2006/035991 of Tara Chand Singhal.

The International Search Report, and the written opinion of the International Searching Authority, dated Mar. 26, 2008 for PCT US/06/35991.

* cited by examiner

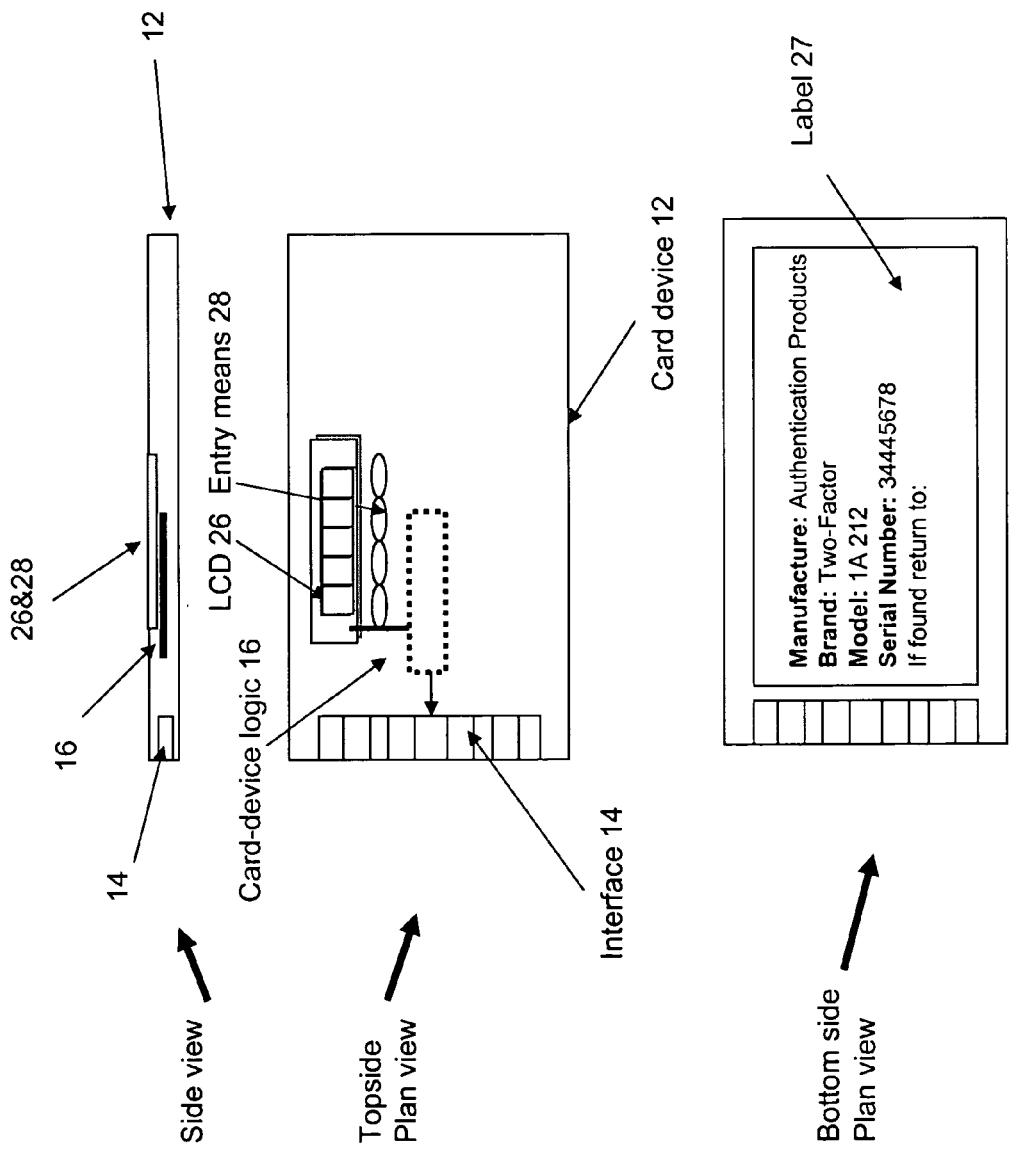

| | |
|---|---|
| At the time of use, user enter a personal identification number into the card-device 12 via means 28 and see entry on the LCD 26 to confirm. 100 |
| User holds card-device between thumb and finger such that thumb is positioned on the sensor area of the card-device ready for insertion to a network-device via interface. 102 |
| Insert the card-device in to network device. The card-device logic detects power, is activated to then activate the camera-logic to read the thumb print. 104 |
| Alternatively for an optical interface, the entry of PIN activates a power on for the internal battery. 106 |
| The camera logic detects thumb pressure/touch on sensor substrate. 108 |
| The camera logic activates light, activates camera and collects a thumb print. 110 |
| The camera logic transfers the thumb print to card-device logic, transforms into a print feature matrix and scrubs its memory. 112 |
| The card-device logic activates GPS chip 30 and reads the location and transfers the location to card-device logic and scrubs its memory. 114 |
| The card-device logic activates the radio clock and reads the time and transfers to card-device logic and scrubs its memory. 116 |
| The card-device logic reads the reads the card S/N, erases PIN from display, creates an encryption key, encrypts the PIN, the card id, the location, the time, and thumb print matrix and creates an authentication record for transfer out of the device. 118 |
| The interface logic transfers the authentication record via interface to network device. 120 |
| User remove the card-device. 122 |

Figure 3A

| | |
|---|---|
| Enter a PIN in a remote user authentication device. | 124 |
| Converting the PIN into an encryption key using a card-specific algorithm | 126 |
| Delete the PIN | 128 |
| Encrypt an authentication record using the encryption key. | 130 |
| Delete the encryption key. | 132 |
| Transfer the encrypted record to a network device. | 134 |

Figure 3B

| | |
|---|---|
| Receive authentication record from network I/F. | 140 |
| Using Card S/N find authentication record in database 52. | 142 |
| Recreate the encryption key from the PIN and the card specific algorithm pre-stored in the authentication database. | 144 |
| Decrypt the authentication record using the key. | 146 |
| Check the factor flags that are on/off for an application. | 148 |
| Verify the authentication factors in the record against the pre-stored data for those factors. | 150 |
| If comparisons pass, send authentication successful message. | 152 |

Figure 4D

SYSTEMS AND METHODS FOR
MULTI-FACTOR REMOTE USER
AUTHENTICATION

CROSS REFERENCE TO RELATED APPLICATIONS

This application claims priority on Provisional Application Ser. No. 60/717,613, entitled "Method And Apparatus For Multi-Factor Remote User Authentication" filed on Sep. 16, 2005, by Tara Chand Singhal. The contents of the Provisional Application Ser. No. 60/717,613 are incorporated herein by reference.

This application also claims priority on Provisional Application Ser. No. 60/729,043, entitled "Method And Apparatus For Multi-Factor Remote User Authentication" filed on Oct. 21, 2005, by Tara Chand Singhal. The contents of the Provisional Application Ser. No. 60/729,043 are incorporated herein by reference.

FIELD OF THE INVENTION

The present invention is directed to a card-device that is able to dynamically perform multiple factors of remote user authentication into a network with one card-device alone and an authentication system that supports such a card-device.

BACKGROUND

In Information security, the authentication of a remote user to an authentication system is judged by factors of, "what you know", "what you have" and "what you are". The "what you know" factor refers to a PIN or a password that a person knows. The "what you have" factor refers to a security card or token in the personal possession of a person and "what you are" factor refers to a biometrics measurement of a person such as a fingerprint or retina print.

According to the information security industry guidelines, using only one of these factors of authentication is considered a weak form of authentication and using any two factors is considered a strong form of authentication.

The most common form of two-factor authentication uses a password and a security token. Many companies make security cards or tokens, such as RSA Data Security and others in different form factors. The use of a biometric factor of "what you are" requires a separate biometric sensor and for reasons related to cost and logistics is rarely used.

The implementation of these three factors of remote user authentication burdens the remote user and the authentication system as these factors are complicated to use for the remote user and costly to use and deploy for the authentication system. In light of the above, it is an objective of the present invention to have better apparatus and methods that enable use of multi-factor remote user authentication.

SUMMARY

This invention discloses a multi-factor remote user authentication card-device in the form factor of a prior art one-factor of "what you have" security card. The multi-factor card-device has innovative features that enable this one card-device itself to function and accomplish a multi-factor remote user authentication of "what you know", "what you have" and "what you are", to a network. In addition, an optional fourth factor of authentication of "where you are" is disclosed.

This invention discloses different embodiments where one card-device of this invention may function as a two-factor authentication device, a three-factor authentication device or a four-factor authentication device.

A fourth factor of authentication of "where you are" is disclosed that uses GPS location data via GPS sensor chip within the card-device to provide this factor of authentication such that if the card-device is authorized to be used from certain locations and it can only be used from those locations and not from any other location because the earth coordinates of these locations are pre-stored in the authentication database.

An assurance factor of authentication that uses the features of a radio clock embedded in the device is also disclosed so that the time of the use of the device can be tightly controlled. Other assurance factor that work in conjunction with an authentication system, such as time window and calendar window are also disclosed.

This invention, it is believed, by the use of the card-device provides better remote user authentication and information security at a reduced cost and with better logistics.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts. The drawings are:

FIG. 2B is plan and side views that illustrate a version of the current invention of a different two-factor authentication card-device.

FIG. 3A is a version of the flow diagram of current invention of a multi-factor authentication card-device.

FIG. 3B is a version of the flow diagram of current invention of a use of a encryption key created in the card-device from what you know factor of authentication.

FIG. 4D is a flow diagram of the authentication system.

DESCRIPTION

Introduction

Figure 1A:
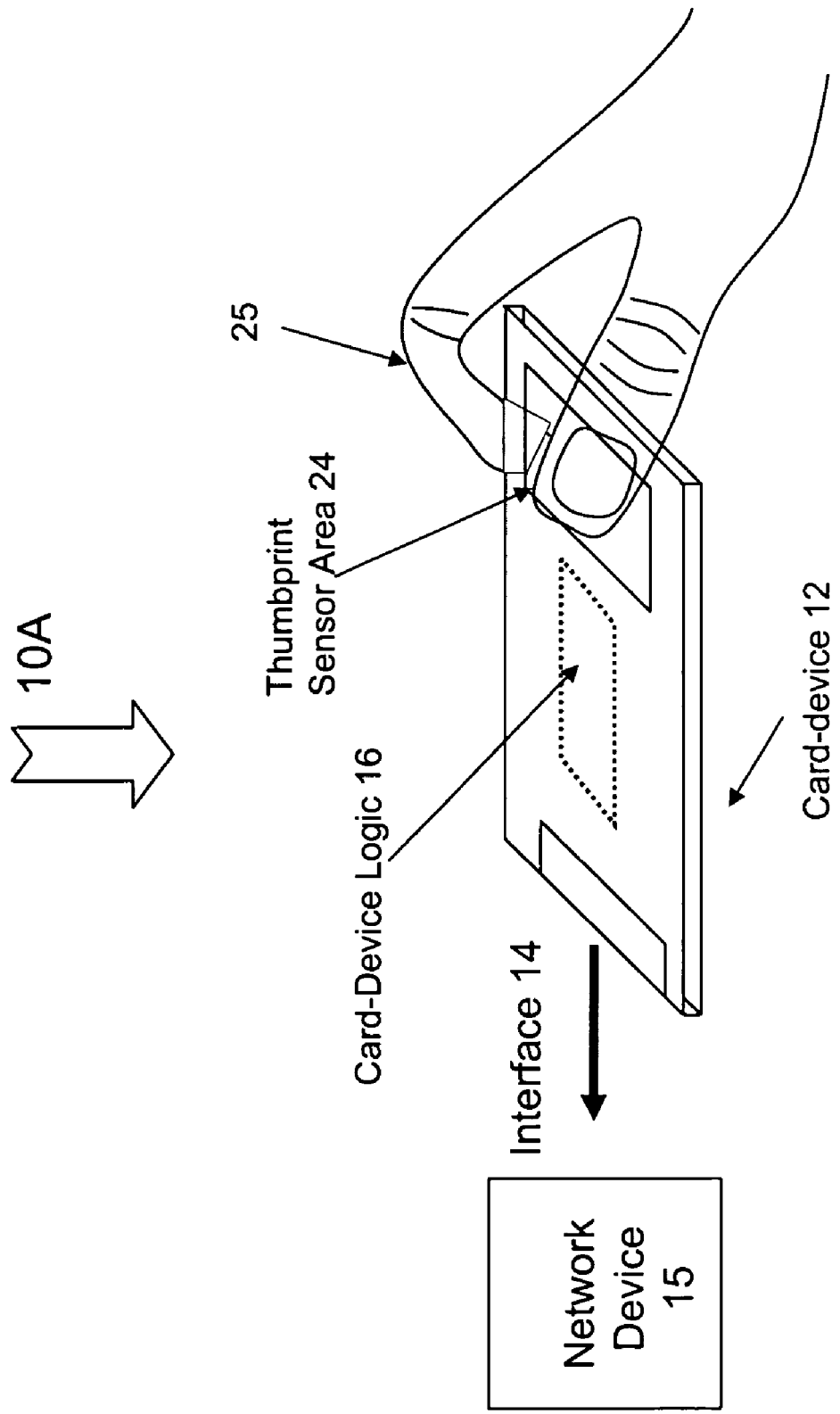
FIG. 1A is a perspective diagram that illustrates a version of the current invention of a two-factor authentication card-device.

In the science of remote user authentication, there are three different ways or "factors" by which a remote user to a system such as on an Internet or computer network may be authenticated. One of these three factors is, "what you know", which could be a personal identification number, an alphanumeric password or a word such as mother's maiden name. Another of these factors is "what you have", which could be a smart card or a security token in the personal possession of a user, that is given to the user by the business which owns or manages the network. Companies such as RSA Data security and ActivCard, to name a few, make such cards. These cards may be and usually are hardware and software devices embedded with logic and codes that are personalized for the remote user. Such cards may have an interface by which they are read by an interface device to the computer network, or they may generate a code, which is then used by the user to enter in a device or screen as part of "what you have" factor. Or they may be static cards such as an ATM card with a magnetic strip. The third factor is "what you are", which is a biometric measure of the user such as fingerprint, retina print, and handprint.

Due to the security issues associated with each of these factors, the information security industry considers the use of any one of these factors as a one-factor authentication or as a weak form of remote user authentication and considers the use of any two factors as a two-factor authentication or a strong form of remote user authentication.

For many secure systems, use of a two-factor authentication is required, and for highly secure systems used in national defense, use of three-factors may be considered necessary.

Since there are three different factors, three separate, time consuming and overt acts are required of the remote user. For the, "what you know" factor, a login screen is presented to the user requiring the user to enter a user id and a password. For "what you have" factor, a physical card or security token is required and needs to be inserted into a card reader. In some versions of the physical card a randomly changing number that is synchronized with time is read from the card and then manually copied into the login screen. The card also has a serial number, which is also manually entered into the login screen. For a third factor, biometric, "what you are", a separate biometric sensor is needed where the user is required to place a body part to measure it. The logic in the network device then collects these three separate factors and communicates with an authentication server, which verifies that these three remote user authentication credentials do indeed belong to the remote user to satisfy the three-factor authentication requirement.

In addition to the separate physical and overt acts required of the remote user, as described above, there are a number of security issues associated with how these factors are used. These issues are that: (i) for the "what you know" factor of a password, it is always keyed in with the help of a keyboard or similar interface into the network device, such as, a laptop computer, from where it is subject to theft by logging the keystrokes or other means of deception, and (ii) the password, user id and card serial number are entered into the memory of the network device and may be compromised with clever hacking such as hidden malicious code. There are many other security as well as logistics issues related to the use of these factors of authentication that have been covered extensively in the news media.

The current invention eliminates these problems and issues, related to separate physical overt acts as well as security, cost, and logistics issues in providing a two-factor and a three-factor remote user authentication. In addition, an optional fourth factor of authentication of "where you are" is disclosed that may provide even greater security. In addition to these factors, other additional authentication assurance methods that work within an authentication system are also disclosed.

There are multiple embodiments that are possible, some of which are described here, while others are possible and are not ruled out.

In a first embodiment, a remote user authentication device has a hand-held card-device with an interface means and an embedded computer logic, wherein the logic and the interface means are used to interface the device to a network for a "what you have" factor of authentication. The card-device is adapted with a thumbprint sensor on a part of the device for when the device is held; the thumb is naturally placed on the sensor, enabling capture of a thumbprint of a cardholder. The device may be in the form of a flat card with, a topside, a bottom side, a left edge, and a right edge, wherein the interface may be on the left edge, and the sensor may be on the topside and near the right edge.

The logic and the interface means transfer a card identification and the captured thumbprint to a network, wherein the thumbprint is for use as a "what you are" factor of authentication.

In this first embodiment, with reference to FIG. 1A, this invention 10A includes a card-device 12 in the form factor of prior art security tokens and cards that include an interface 14 that is used to interface to a network device 15, a card-device logic 16 and a thumbprint sensor area 24, so that when the card is held in the hand 25, with the thumb gripping the upper part of the card-device, away from the interface 14 end, at the area 24 and the index finger is placed underneath the card, as would be in naturally holding the card for it ready to be inserted into the device 15, then the thumbprint is taken by the card-device 12 without the user doing anything more and then this card-device alone acts as a two factor authentication of "what you have" and "what you are" factors. The card logic 16 holds a card serial number and an encrypted version of card identification in its memory. This embodiment is further described later with reference to FIGS. 2A, 3A, 4A, 4B, and 4C.

In a second embodiment, a remote user authentication device that has a hand-held card-device with an interface means and an embedded computer logic, wherein the logic and the interface means are used to interface the device to a network for a "what you have" factor of authentication. The card-device is adapted with an entry and display means and a logic that enable entry and display of a PIN into a temporary memory of the logic, wherein the PIN is a "what you know" factor authentication.

The logic and the interface means transfer a card identification and the PIN to the network, wherein the PIN is for use as a "what you know" factor of authentication.

Figure 1B:
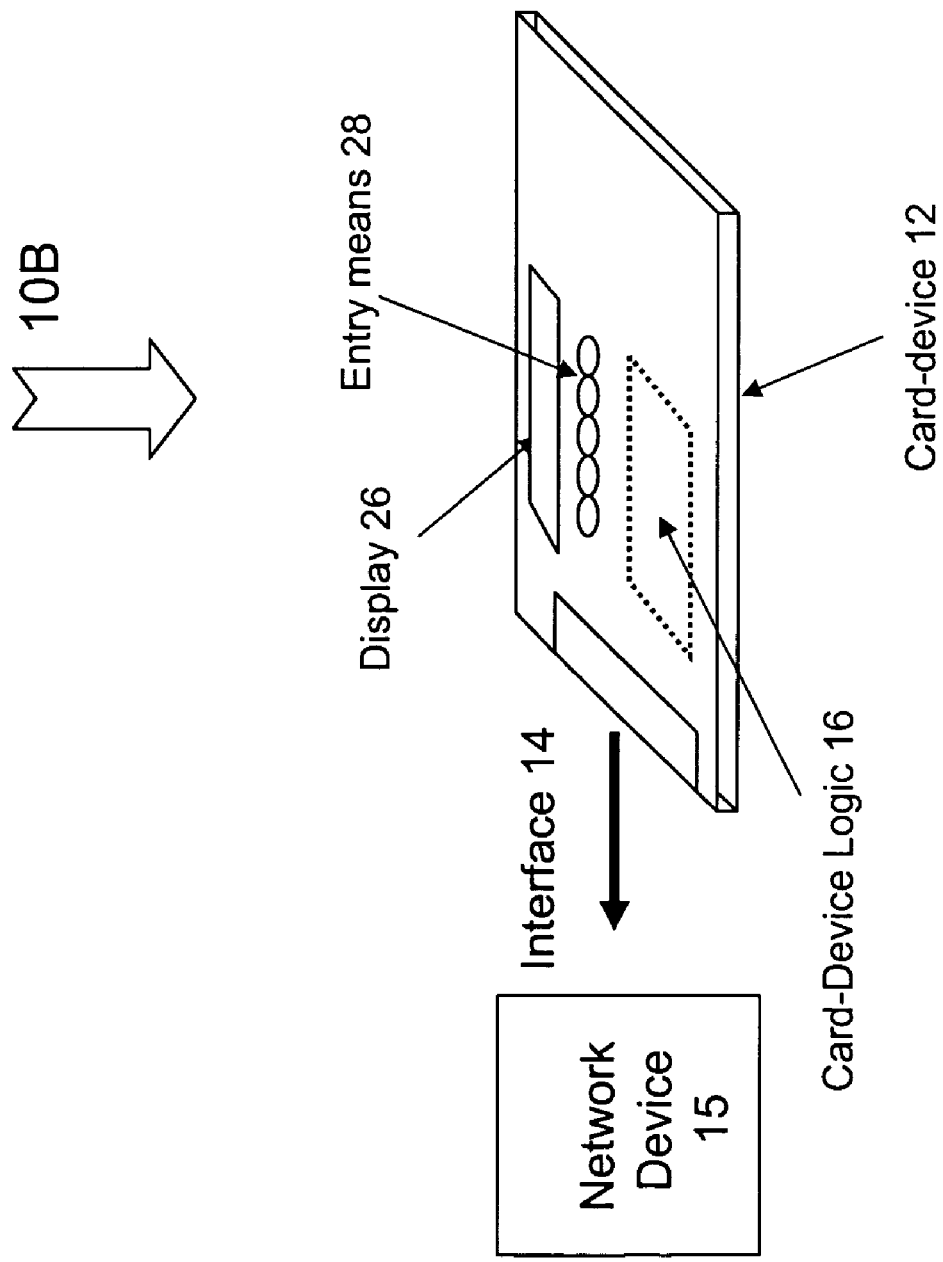
FIG. 1B is a perspective diagram that illustrates a version of the current invention of a different two-factor authentication card-device.

In this second embodiment, with reference to FIG. 1B, this invention 10B includes a card-device 12 in the form factor of prior art security tokens and cards, that include an interface 14 that is used to interface to a network device 15, a card-device logic 16, a liquid crystal display 26 and an entry means 28, so that before the card is inserted into device, a personal identification number is entered by entry means 28 and seen displayed via display 28. This embodiment eliminates the need to enter "what you know" such as a password or PIN in a computing device, thus eliminating the security risk of malicious codes compromising the password, such as key logging as one example. This embodiment is further described later with reference to FIGS. 2B, 3A, 4A, 4B, and 4C.

Figure 1C:
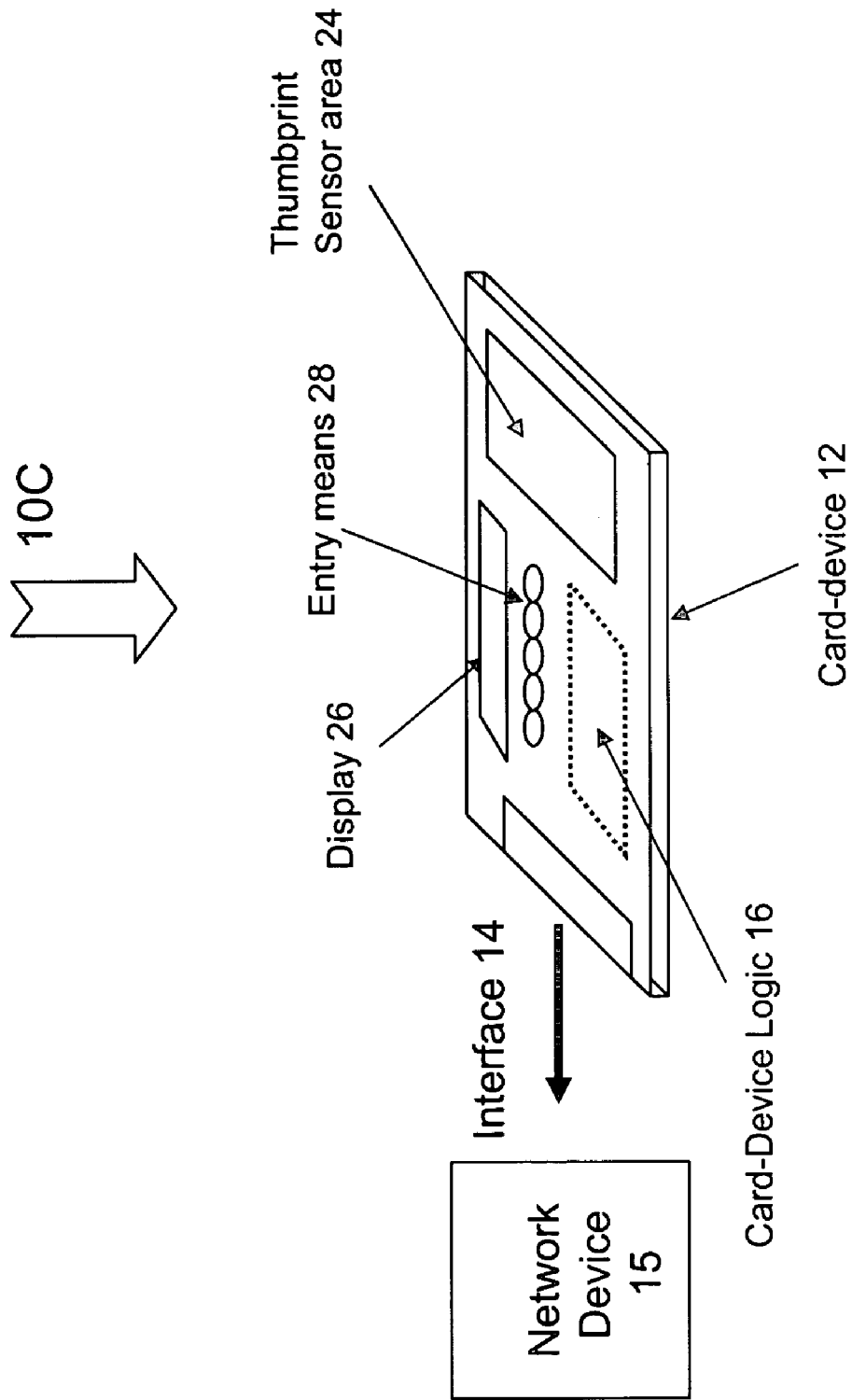
FIG. 1C is a perspective diagram that illustrates a version of the current invention of a three-factor authentication card-device.

In a third embodiment, with reference to FIG. 1C, this invention 10C combines the features of the first and the second embodiment, where the card-device 12 is adapted both with a thumbprint biometric sensor and a entry and display means such that this one card-device 12 alone acts as a three-factor authentication of "what you know, "what you have" and what you are" factors. The card logic 16 holds a card serial number and an encrypted version of card identification in its memory. This embodiment is further described later with reference to FIGS. 2C, 3A, 4A, 4B, and 4C.

Figure 1D:
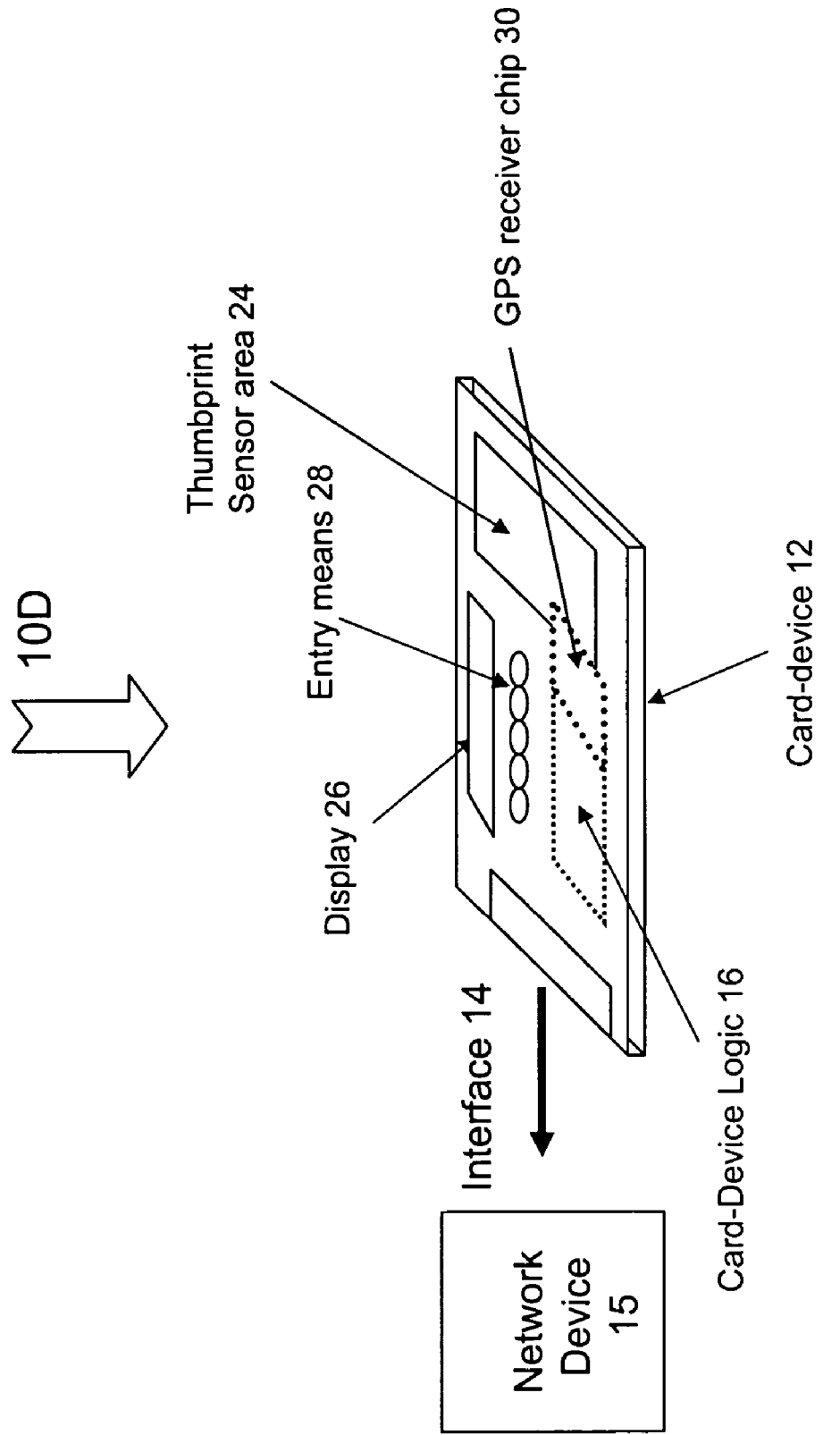
FIG. 1D is a perspective diagram that illustrates a version of the current invention of a four-factor authentication card-device.

In a fourth embodiment, with reference to FIG. 1D, this invention 10D includes a card-device 12 that has the features of the third embodiment having a thumbprint sensor and a data entry and display means. The card-device 12 is also equipped with a GPS receiver chip 30 that will automatically enable a "where you are" factor of authentication to be performed, without any acts on the part of the user as the GPS receiver chip is hidden inside the card-device 12.

This factor uses geographic location data via GPS sensor chip within the card-device to provide this factor of authentication such that if the card-device is authorized to be used from certain locations, it can only be used from those locations and not from any other location because the longitude and latitude earth coordinates of these certain locations are pre-stored in an authentication database. Therefore without the user doing anything more, this card-device 12 alone acts as a four factor authentication of, "what you know", "what you have", "what you are", and "where you are" factors. This embodiment is further described later with reference to FIGS. 2D, 3A, 4A, 4B, and 4C.

The different embodiments of card-device 12 as illustrated above with reference to FIGS. 1A, 1B, 1C, and 1D, may be used in a number of applications such as access to a closed facility, access to a payment transaction terminal such as an ATM, and access to a computer such as laptop or other computer consoles in a secure facility to provide defense-in-depth security as further described with reference to FIGS. 4, 5 and 6. These and other aspects of the invention are described below.

A remote user authentication device that has a hand-held card-device with an interface means and an embedded computer logic that provides a card serial number and an encrypted card identification. The device adapted with an entry and display means and a logic that enables entry and display of a PIN into a temporary memory of the logic for a limited time. The entry means may include a plurality of electronic rotary switches that enable alphanumeric entry of the PIN without a keypad.

With referenced to FIG. 2B, the card-device 12 has an interface end and means 14, card-device logic 16 hidden within the card-device 12. On one side, a liquid crystal display means 26 and a entry means 28 for entry of numbers that display on 26. On the other side of the card, a label 27 that shows manufacturer name, brand name, model name, number and serial number may be present.

The technology for LCD 26 and entry means 28 for this form factor as in card-device 12 are prior art and no specific claim is made. In this embodiment, as there may not be enough space to place a numeric or alphabetic keypad on the card-device 12, the help of switches that increment/decrement a digit similar to a combination lock may be used.

That may be done by use of electronic rotary switch for each of the numeric or alphanumeric digits, where the display for a digit of PIN that is visible on the LCD display may be incremented or decremented by a switch to enter a PIN of multiple digits. Thus the entry means having a plurality of electronic rotary switches that enable alphanumeric entry of the PIN without a keypad. There may be any number of electronic switches, such as, four to eight in number. However, six switches are preferred.

The benefits of entering a PIN for "what you know" factor in the card-device itself as in this invention eliminates the need for a login window for entry of a user id and a password. The card-device 12 of this invention thus eliminates the logistics of a password entry and security issues of password compromise.

The card-logic 16 may be embedded with a heuristic card-specific algorithm (CSA) that transforms the temporary stored PIN to a temporary stored encryption key and the logic 16 uses this encryption key to encrypt the factors of authentication and transfers the encrypted authentication data anchored by card serial number via the interface means 14 to the network device 15.

The benefits of using the PIN to create an encryption key that is used for encrypting the authentication data are that it provides an additional level of security. Since the PIN and the key are neither stored in the card-device 12 nor are they transferred to the network device, being used for a moment in time within the embedded logic 16 of the card-device 12, as the card-device 12 is being held by the card-holder, this provides an additional level of security in how the "what you know" factor is used in this invention.

To further describe this feature, the card-device 12 has a computer logic 16 that, (i) receives a PIN into a temporary memory, (ii) converts the PIN into an encryption key in temporary storage and deletes the PIN, (iii) using the key encrypts an authentication record and deletes the key, and (iv) transfers the encrypted record to a network device for authentication.

The logic 16 uses a heuristic card specific algorithm (CSA) to convert the PIN into a card-specific encryption key. As a simplified illustration, if the PIN is AYK893, the CSA would mathematically operate in any combination of operations such as divide, multiply, add, subtract, bit shift, bit truncate on this PIN to create a 128 bit encryption key.

The card-device 12 may be further adapted with a thumbprint sensor on a part of the device for when the device is held, the thumb is naturally placed on the sensor, enabling capture of a thumbprint of a cardholder in the temporary memory. The logic is adapted to begin thumbprint capture when card is interfaced with the network and not before and hold in the temporary memory of logic until the transfer to the network whereby the device does not hold it the thumbprint except for a brief moment in time.

Figure 2A:
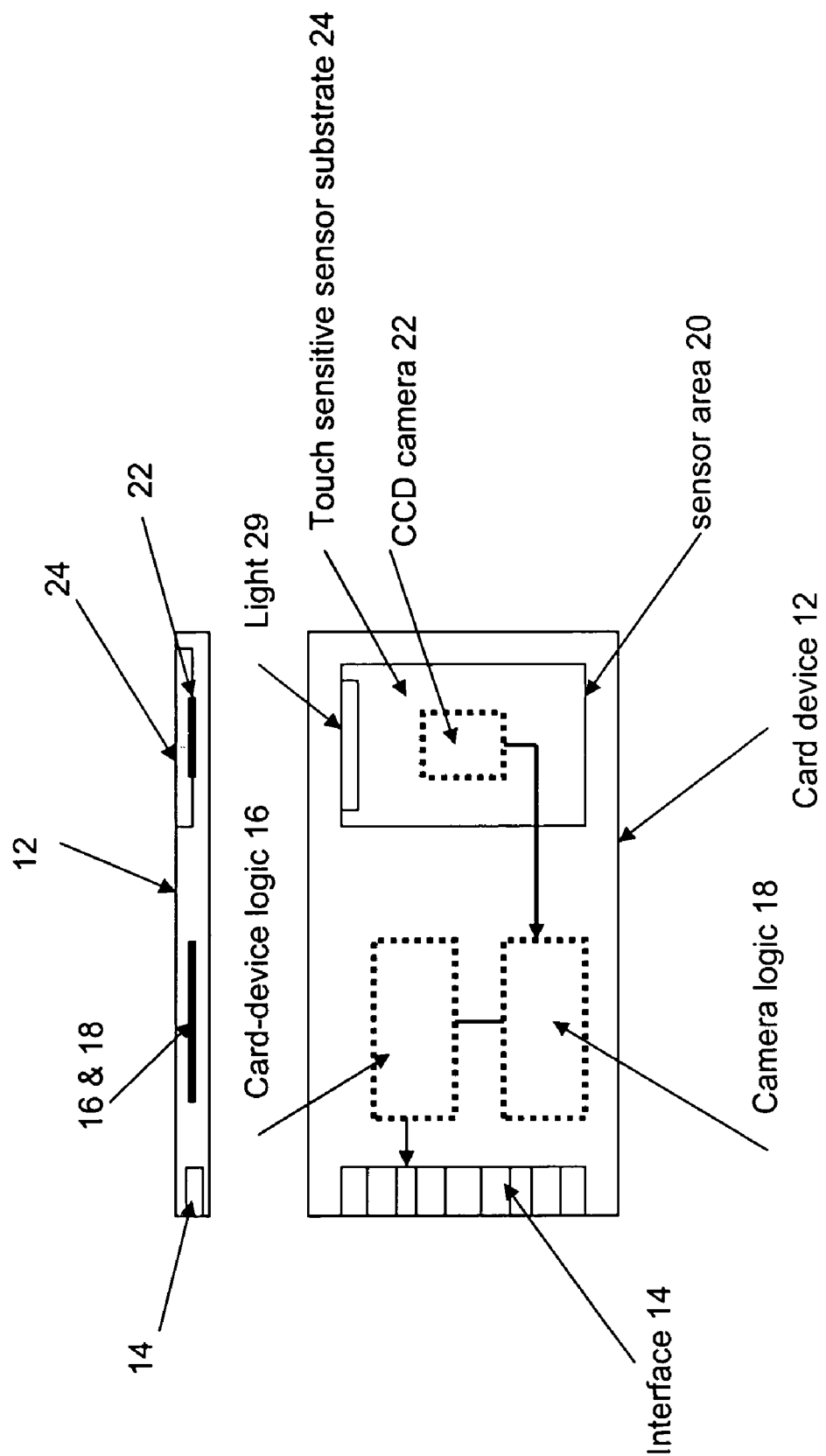
FIG. 2A is plan and side views that illustrate a version of the current invention of a two-factor authentication card-device.
Figure 2C:
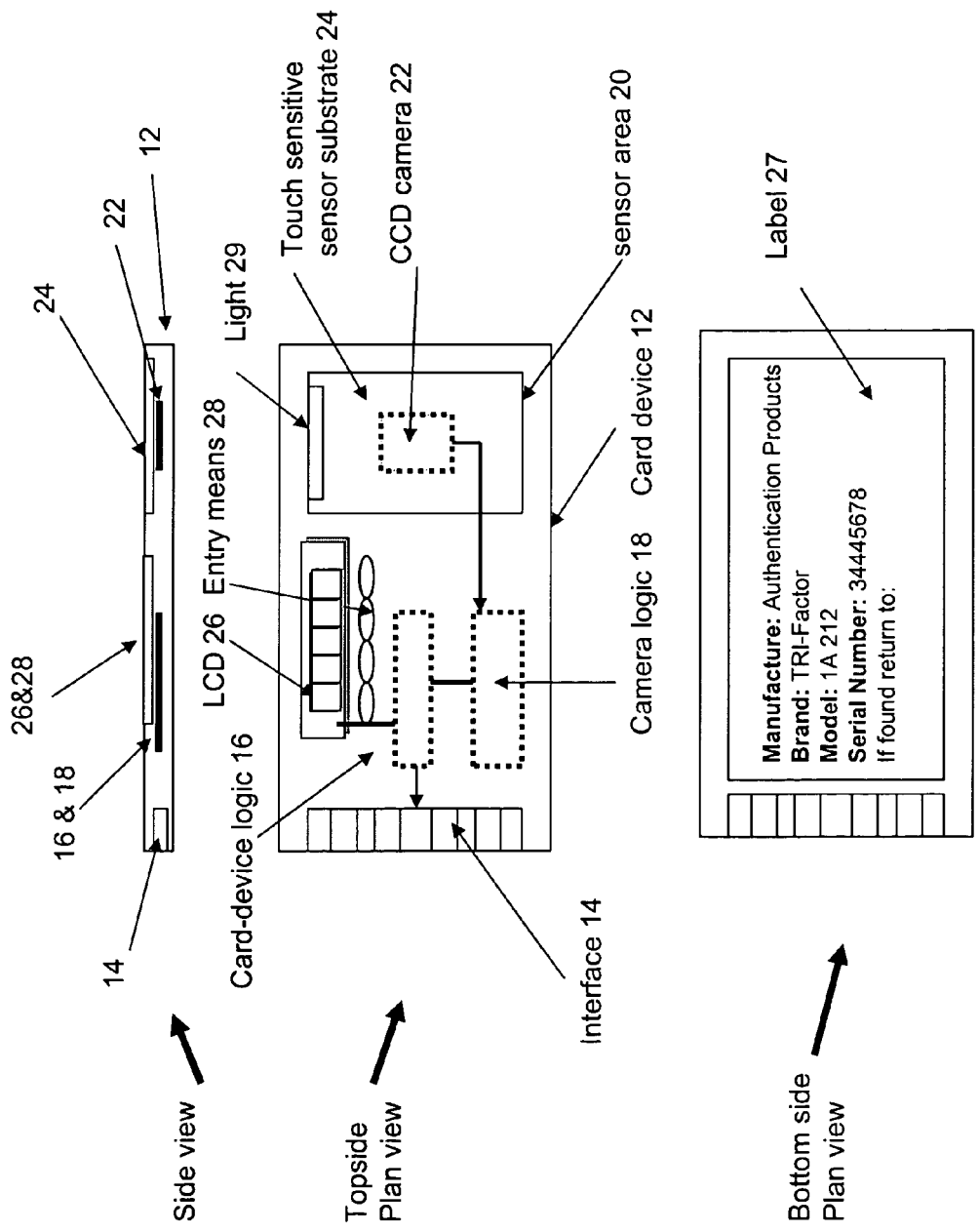
FIG. 2C is plan and side views that illustrate a version of the current invention of a three-factor authentication card-device.

With reference to FIG. 2A, the card-device 12 has an interface end and means 14, card-device logic 16 hidden within the card-device 12, on one side, a sensor area 20, a touch sensitive sensor substrate 24, a light 29, a Charge-Coupled-Device (CCD) camera 22 underneath the sensor, and a camera logic 18 within the card-device 12. On the other side of the card, a label 27 that shows manufacturer name, brand name, model name, number and serial number may be present.

A fingerprint sensor is a prior art technology and no specific claim is made to any part of such technology. A finger print sensor may be based on an optical sensor or a capacitive (semiconductor) sensor technology. Many companies are making many types of fingerprint sensor devices. Examples of companies that make them are, www.Bioenabletech.com, http://www.topazsystems.com, http://www.authentec.com, and http://www.fingerprints.com to name a few. Either of these technologies may be adapted to the form factor of card-device 12 for this invention.

The card-logic 16 is adapted to begin thumbprint capture when card-device 12 is interfaced with the network device 15 and not before and hold the thumbprint in the temporary memory of the logic until the transfer to the network device. The logic 16 is further adapted to create a print feature matrix dataset from the thumbprint and discard the print and the matrix after the feature matrix is transferred to network device. Thus the card-device 12 does not hold the thumbprint except for a brief moment in time.

The benefits of providing a "what you are" factor of authentication as in this invention in the card-device itself where its use is transparent to the card-holder as well as transparent to the system by not having a separate biometric sensor and interface as in prior art, the card-device 12 of this invention provides additional security and cost and logistics benefits.

The interface means 14 may be optical wireless, electronic wired, or short distance wireless RF. The card-device 12 may be powered by one of the means from a group of (i) the interface means when interfaced with the network, (ii) by an internal battery, (iii) by a combination of both in some embodiments.

The card-device 12 may optionally be further adapted with an embedded GPS sensor enabling the location of the card-device 12 to be used as an additional "where you are" factor of authentication. The card-logic 16 is adapted to begin GPS computation when card-device 12 is interfaced with the network device 15 and not before and hold the location data in the temporary memory of logic until the transfer to the network device. Thus the card-device 12 does not hold the location data except for a brief moment in time.

Figure 2D:
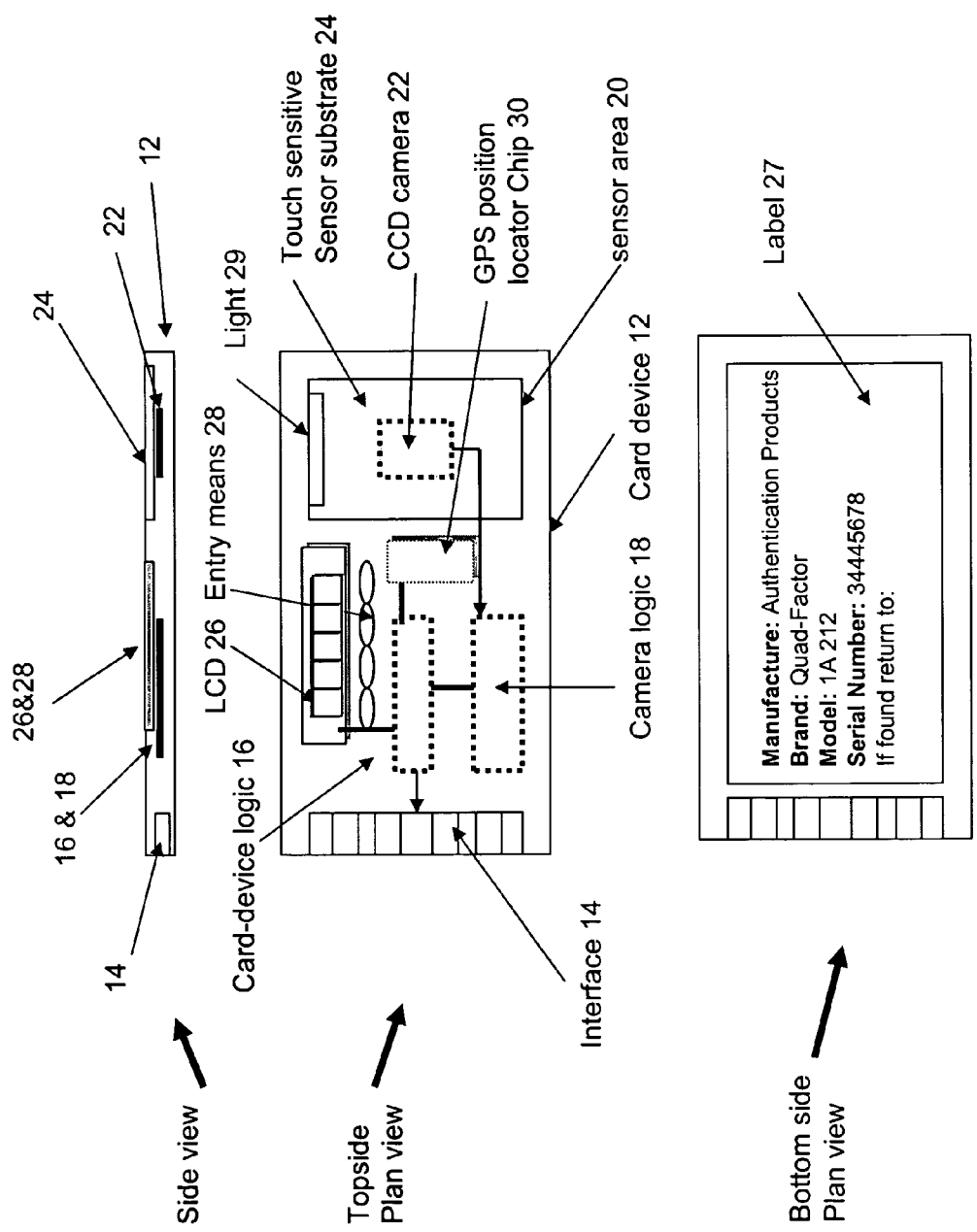
FIG. 2D is plan and side views that illustrate a version of the current invention of a four-factor authentication card-device.

With referenced to FIG. 2D, the card-device 12 has an interface end and means 14, card-device logic 16 hidden within the card-device 12. The card-device 12 is equipped with a GPS receiver chip 30 that will enable a "where you factor" of authentication to be performed.

Many manufacturers, such as SIGE Semiconductor, make a GPS receiver chip that will fit in the form factor of the card-device 12. A recent news item said, "SiGe Semiconductor reckons it has produced the industry's most cost effective Global positioning System (GPS) solution to address the performance, size and battery life requirements of cellular phones. SE8901 GPS receiver system is based on an innovative architecture that allows cellular handset manufactures to fully support new location based services at a price below $5.00.... The receiver IC integrates a GPS radio, GPS processor accelerator, high performance on chip LNA and image reject mixer in a compact 4×6 mm package". Hence small GPS receiver chip such as this can be easily embedded into the card-device 12.

The benefits of a location device on the card-device 12 itself, as in this invention, where its use is transparent to the cardholder and transparent to the authentication system without having to create an extra sensor and interface, provides an additional factor of authentication of "where you are". There are different ways the location may be used such as to limit the card-device use form certain physical locations such as one or more cities or one or more buildings in a city. Thereby excluding use of the card-device use from other cities or locations that are not specifically pre-stored in the authentication database.

The card-device 12 may optionally be adapted with a radio clock sensor and mechanism chip (not shown), which computes the time of card-device use by the cardholder and transfers such time, via the interface 14, as an additional means of security assurance. The radio clock is prior art and is used widely in many applications where the time is automatically provided by the radio signal. The sensor and chip are, it is believed, in the form factor that are easily incorporated in the card-device 12 and may be hidden and transparent to the use of the card-device by the cardholder.

An agency of the US government, National Institute of Standards and Technology (NIST), maintains and operates the atomic clock and the generation of the radio signal. Other countries also maintain their own atomic clocks and corresponding radio signals.

The use of a radio clock to identify, in time, when a cardholder uses a card-device 12 for authentication, and then sending the time via the interface 14 as part of an authentication record acts as an additional means of security assurance. By comparing the time of the use of the device 12 as provided by the embedded radio clock with the time when the authentication record is actually received by the authentication server enables the authentication server to assure that there has not been time available to alter or reuse the authentication record.

As a simplified illustration of this security feature of a radio clock embedded in the card-device 12, if the time when the card-device 12 is used as computed by the radio clock to be 13:27:33 and this time is embedded in the authentication record out of the card-device 12 and if the time when the authentication record is received by the authentication server is 13:27:35, then the time difference of two seconds may be within limits required for the authentication record to travel through the network. If the time difference is significantly more than two seconds, there is a possibility that the authentication record may have been maliciously reused or altered. The authentication record with the embedded radio clock time is encrypted out of the card-device and hence cannot be altered and thus provides an additional means of security assurance.

The card-device 12 is optionally adapted with an RFID mechanism chip (not shown) that identifies the card-device by a serial number; wherein the card-device 12 may be tracked when entering and leaving controlled high security areas such as an airport or a government building.

The RFID technology is prior art and its use in the authentication card-device 12, as in this invention provide a means to track the location of the card-device as its enters or leaves closed areas such as floors of building or a building itself as an additional means of assurance that the device is confined to a physical area for additional security or it is known when the card-device 12 does leave a closed area.

The card-logic 16 and the interface means 14 are used to interface the card-device 12 to a network device 15 to provide it, (i) a card identification for a "what you have" factor of authentication, (ii) a PIN for a "what you know" factor of authentication, (iii) a thumbprint, for a "what you are" factor of authentication, (iv) location for "where you are" factor of authentication, and (v) time, for "when you are".

The card-logic 16 creates and the interface means 14 transfers an authentication record that may include a card serial number plus an encrypted data string that embeds, (i) encrypted card identification, (ii) thumbprint feature matrix, (iii) latitude and longitude location, (iv) and the radio clock time, where the entered PIN has been converted into an encryption key which has been used to encrypt this authentication record.

The device interface means 14 are optical, or wireless, or wired. The benefits of a wireless interface, as shown in FIG. 5, are that the device does not leave the hands of cardholder and is thus not likely to be misplaced by being forgotten from the task of inserting and removing from the network interface. Furthermore, it is believed, it may be faster and more convenient for the user to operate a device for authentication with this feature of the invention.

Figure 5:
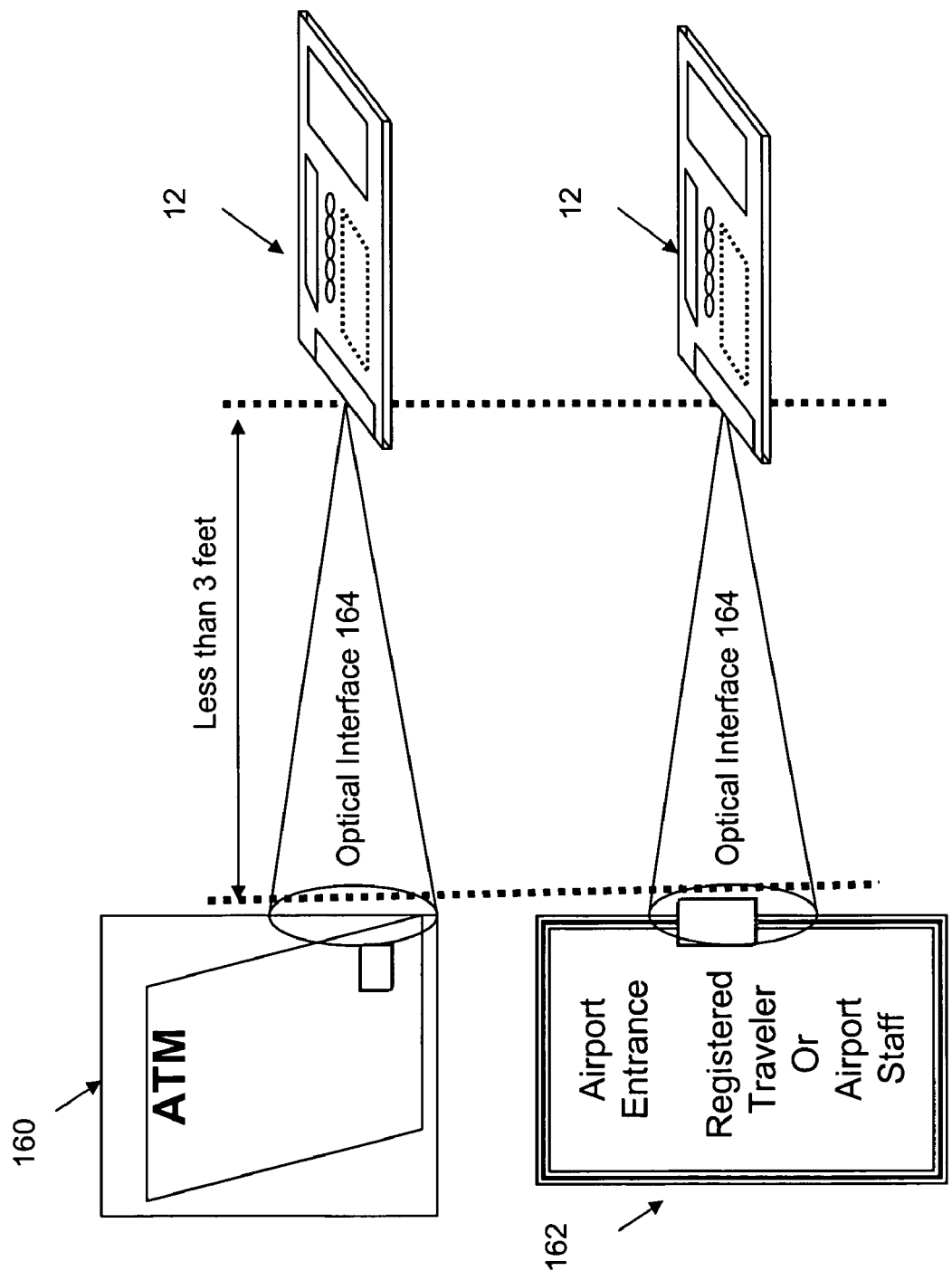
FIG. 5 shows applications and benefits of wireless interface of the card-device of the current invention to a network such as financial or facility access.

As shown in FIG. 5, the use of wireless interface such as an optical interface 164 for authenticating to a financial network via an ATM 160 or authenticating to a controlled facility access network via a controlled gate 162 provides advantages where the card-holder does not need to insert and/or plug the card-device 12 into the network device interface. Thus the card-device 12 does not leave the hands of the cardholder and may be more convenient and faster to use and thus provides additional logistics and security benefits. The technology for wireless and optical use is prior art.

The card-device 12 may be adapted with an on/off logic (not shown), that activates to ON state when entry of PIN is attempted and activates to OFF state at expiry of a fixed time or when the card-device transfers data via the interface 14, which ever occurs first The operation of card-device 12 is described with reference to FIG. 3A, where all the steps may not be used or used in the order specified herein.

At step 100, at the time of use, user enters a personal identification number into the card-device 12 via means 28 and sees entry on the LCD 26 to confirm.

At step 102, user holds card-device 12 between thumb and finger such that the thumb is positioned on the sensor area of the card-device ready for insertion to a network-device 15.

At step 104, user inserts the card-device 12 into the network device 15. The card-device logic 16 detects power, is activated to then activate the camera-logic to read the thumbprint.

At step 106, alternatively for an optical interface, the entry of PIN activates a power on from the internal battery. 106

At step 108, the camera logic detects thumb pressure/touch on sensor substrate.

At step 110, the camera logic collects a thumbprint.

At step 112, the camera logic transfers the thumbprint to card-device logic, transforms into a print feature matrix and scrubs its memory.

At step 114, the card-device logic 16 activates the GPS sensor chip 30 and gets the location and transfers the location to card-device logic 16 for temporary storage in the memory.

At step 116, the card-device logic 16 activates the radio clock and reads the time and transfers to card-device logic for temporary storage in the memory.

At step 118, the card-device logic 16 reads the card serial number, erases PIN from display, creates an encryption key, encrypts the PIN, the card id, the location, the time, and thumb print matrix and creates an authentication record for transfer out of the device.

At step 120, the interface logic 14 transfers the authentication record via interface to network device 15.

At Step 122, the user removes the card-device 12 from the network device interface.

As shown in FIG. 3B, to facilitate the card-device where the PIN is used as an encryption key in the card device a method of remote user authentication may have the steps as follows.

At step 124, user enters a PIN in a remote user authentication device.

At step 126, card-logic 16 converts the PIN into an encryption key using a card-specific algorithm.

At step 128, card-logic 16 deletes the PIN.

At step 130, card-logic 16 encrypts an authentication record using the encryption key.

At step 132, card-logic 16 deletes the encryption key At step 134, card-logic 16 transfers the encrypted authentication record to a network device.

Figure 4A:
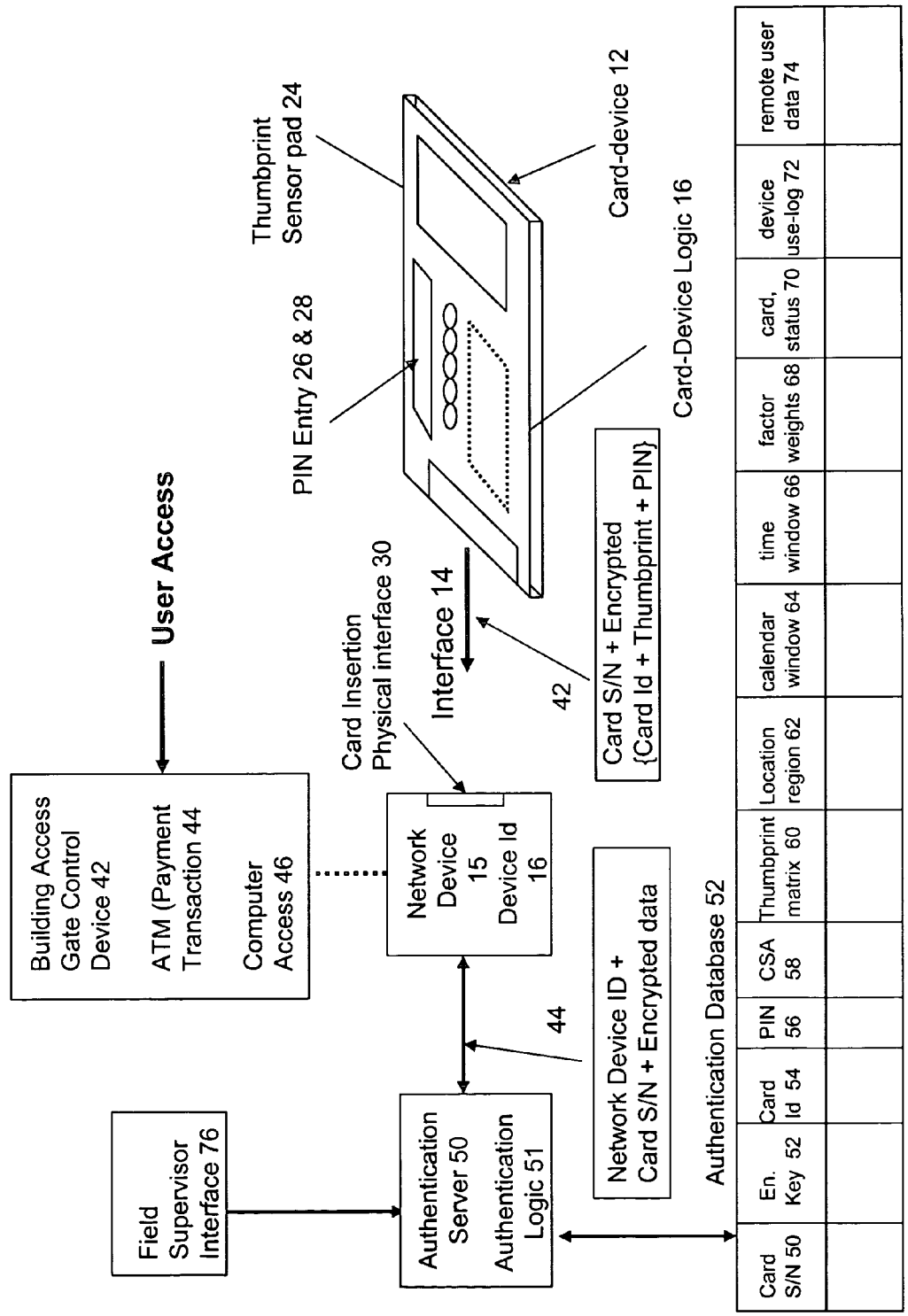
FIG. 4A is a block diagram of current invention that shows the application and use of the card-device in an authentication system.

As shown in FIGS. 4A, the card-device 12 works with an authentication system that has an authentication server 50, an authentication database 52, a network device 15 with a card interface means 30.

The authentication server 50 is prior art and executes an authentication logic 51 of this invention as described later.

The authentication database 52 may have fields from a group that correspond to multiple factors of authentication of, (i) encrypted card id 54, (ii) PIN 56, (iii) thumbprint matrix 60, (iv) a plurality of geographic locations in lat/long boundaries 62. The database 52 may have further fields from a group of (i) device serial number as a record identifier 50, (ii) remote user data 74, (iii) card status 70, and (iv) device-use log information 72.

The authentication database 52 may have one or more fields for heuristic card-specific algorithm 58 for converting the PIN into an encryption key for decrypting the authentication record to get at the factors of authentication. The authentication database 52 may also have fields from a group that correspond to others aspects of authentication of, (i) calendar window 64, (ii) time window 66, (iii) and weights for each of the factors 68.

As shown in FIG. 4A, the authentication system may also have an interface 76 to the authentication server 50 that enables an authorized person such as a field supervisor, to expand the geographic location and/or the time window, for field workers on a temporary basis. The interface 76 may be from a remote location with a cell phone, where the interface is authenticated to the server 50 via the cell phone's SIM and an entered PIN for this authentication of the interface 76. The interface 76 when authenticated may provide an interactive voice menu that will facilitate to identify the worker and the change to the time window or the location window.

As a simplified illustration of this interface 76 feature, if an airport worker reports for work at Los Angeles airport for the shift hours of 7 AM to 3 PM, then the authentication database 52 has fields corresponding to them, so that the worker can only be authenticated at the facility access gate of the Los Angles airport between those hours by using the card device 12 and the authentication system. When there has been a change in work assignment due to an emergency, and the worker has to report to another airport such as Burbank, on a different shift, the field supervisor may be able to change the authentication database 52 on a temporary basis to change the locations and the time window that correspond to the Burbank airport and the different shift hours. Then the airport worker is able to use the card-device 12 at a facility access gate at the Burbank airport, between the hours of the new shift on a temporary basis.

The application and security features of card-device 12 are further described with reference to FIGS. 4A and 4B.

As shown in FIG. 4A, as the card-device 12 is inserted into card insertion physical interface 30 of network device 15, with a network device id 16, a data record 42 made of (i) card S/N, and (ii) encrypted version of (card id, thumb print and PIN) is transferred to the network device 15.

The network device 15 then sends a data record 44 that includes the (i) network device id 16 and (ii) data record 42 to an authentication server 50.

The server 50 has access to an authentication database 52 that pre-stores card s/n, encryption key, card id, thumbprint, and PIN. The authentication logic 51 using the database 52, first identifies the authentication record by card serial number and then authenticates the three factors of card id, thumb print, and PIN, corresponding to "what you have", "what you are", and "what you know" factors.

An encryption key, in the card-device logic 16, is used to encrypt the card id, the thumbprint and PIN in the card-device 12, so that they travel as one data record 42 in encrypted form to the server 50 via network device 15, where the authentication logic 51 first decrypts the record for verification and then the data is used for user authentication.

As shown in FIG. 4A, the application of card-device 12 may be used in many applications, generic examples of such uses are for facility access 42, a payment terminal 44 and computer access 46.

Figure 4B:
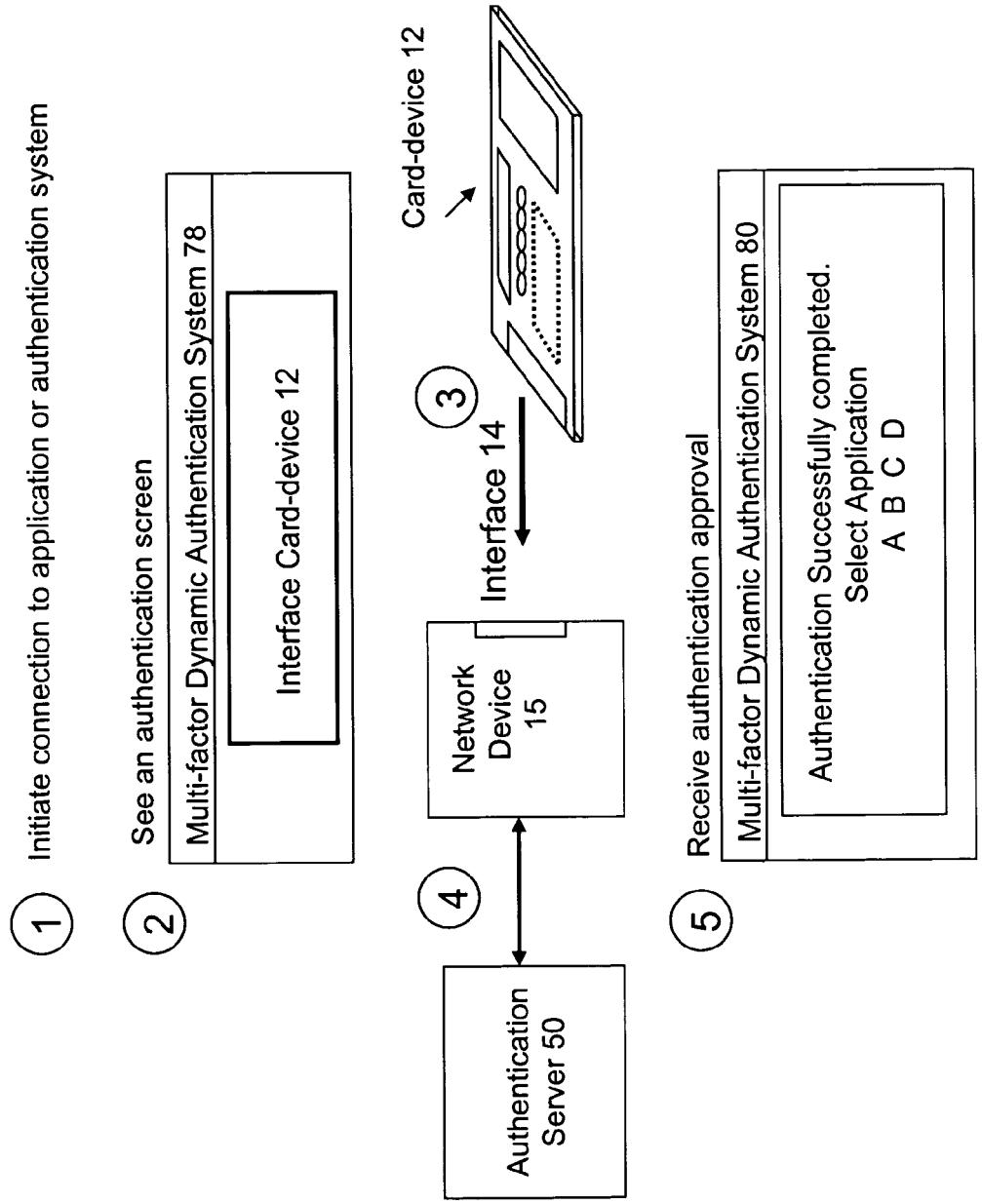
FIG. 4B is a flow diagram of current invention that shows the application and use of the card-device for remote user authentication with the authentication system.

As shown in FIG. 4B, at step 1, a user with card-device 12 connects to the authentication server 50 via network device 15. At step 2, the authentication logic 51 displays an authentication screen 78, as shown, asking for the use of the card-device 12. In some applications that connection may already be present and the authentication screen 78, may already be displayed such as in facility access or ATM access.

At step 3, the user interfaces with network device with the card-device 12 via optical means or by inserting the card-device 12 in the network device 15. At step 4, the authentication record is transferred to the authentication server 50 and at step 5, the authentication granted screen 80 is displayed to the user, enabling the user to enter the facility or select a transaction such as in an ATM application. The use of this method while providing multiple factors of authentication has eliminated a login screen requiring entry of a password, and has eliminated the use of a separate biometric sensor.

In this invention, by the use of card-device 12, the prior art use of a login window and its associated security issues and additional steps required of a user are eliminated. This, it is believed, provides a better security than prior art use of multiple authentication factors that rely on the use of a login window.

In this invention, the automatic use of a thumbprint as part of the act of holding and inserting card-device 12 eliminates the separate and overt factor and use of a biometric sensor as in prior art. This it, it is believed, provides better security than prior art use of multiple authentication factors that rely on a separate biometric sensor.

As an additional security feature of this invention, the card-device 12 does not hold or contain any data related to the identity of the cardholder. Hence, if the card-device 12 is lost, the personal identity data of the cardholder is not lost and thus cannot be misused by others with malicious intent.

Prior art authentication card devices such as those used by the Government, called Common Access Cards (CAC) embed on the card itself different items of the personal identity data of the card holder, such as, thumbprint, picture, name and other identification data. Even though such data is digitized and may be encrypted, it can still be reverse engineered given sufficient time and is thus susceptible to misuse. In contrast, the card-device 12 of this invention provides security features that are not present in prior art remote user authentication devices. Since there is no personal identity data present in the card-device 12, it is not even subject to be discovered and misused even by reverse engineer from the card logic in the card-device 12.

Figure 4C:
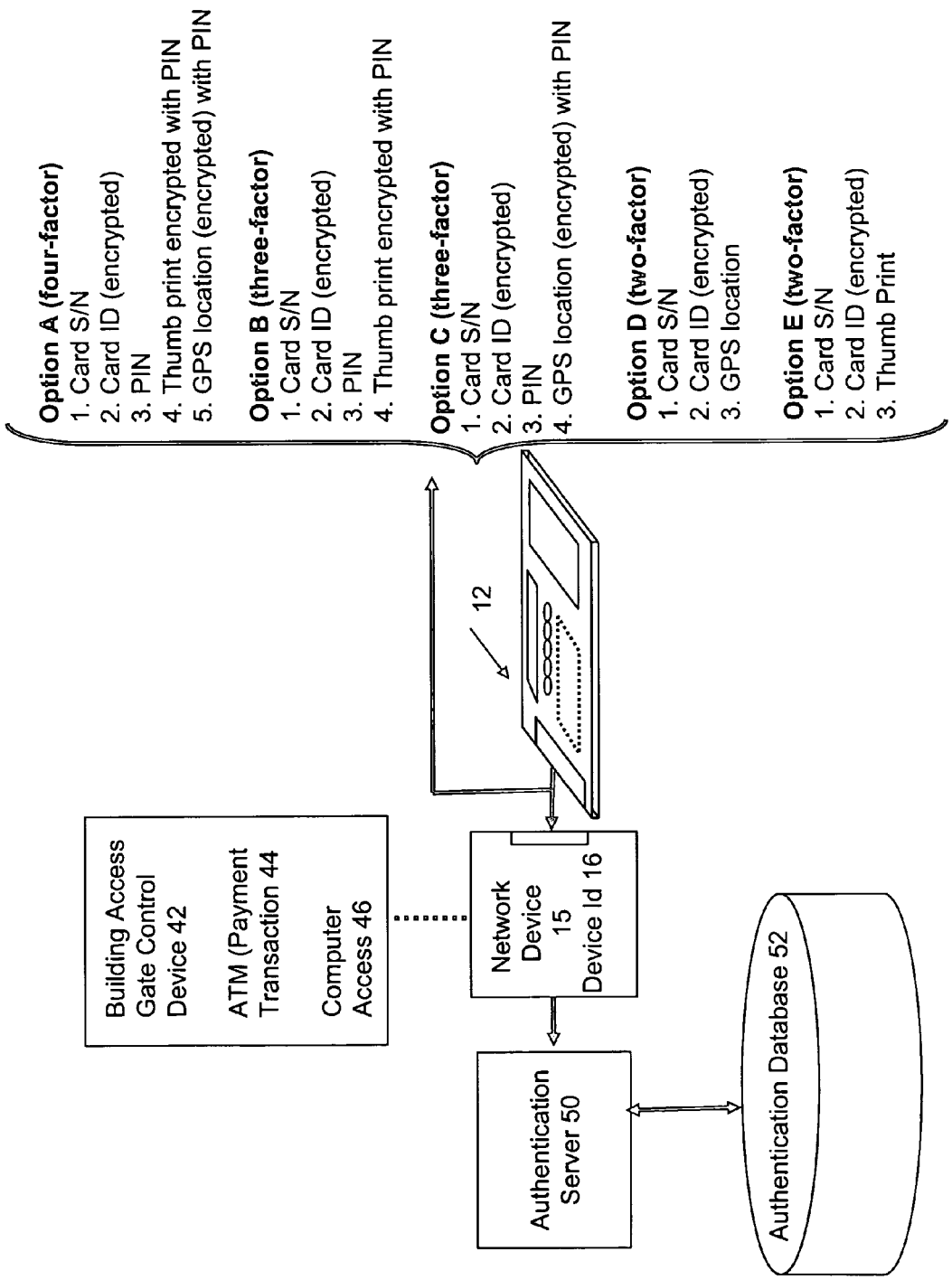
FIG. 4C is a block diagram of current invention that shows the application and use of the card-device as a dynamic multi-factor remote user authentication device.

As shown in FIG. 4C, the four different factor of remote user authentication using the card-device 12, as described above, may be used in different combinations of, any two-factors, any three-factor and as a four-factor device. In all of these options the card serial number is used to reference the authentication record in the authentication database 52. The one-factor that is required in all of these options is the card id, while other factors may be substituted with other factors for different applications with different security environments.

FIG. 4C illustrates different options on how the card-device 12 may be used.

Option A (four-factor)
1. Card S/N
2. Card ID (encrypted)
3. PIN
4. Thumb print encrypted with PIN
5. GPS location (encrypted) with PIN Option B (three-factor)
1. Card S/N
2. Card ID (encrypted)
3. PIN
4. Thumb print encrypted with PIN Option C (three-factor)
1. Card S/N
2. Card ID (encrypted)
3. PIN
4. GPS location (encrypted) with PIN Option D (two-factor)
1. Card S/N
2. Card ID (encrypted)
3. GPS location Option E (two-factor)
1. Card S/N
2. Card ID (encrypted)
3. Thumb Print Option F (two-factor) (not shown)
1. Card S/N
2. Card ID (encrypted)
3. PIN, Thumbprint and GPS location (encrypted) with PIN based encryption key.

In option F, in the card logic 16, the PIN may itself be used as an encryption key or used as an input to a key creation formula to create an encryption key, which then may be used to encrypt the other factors of PIN, thumbprint, and the location, thereby providing another layer of security since this encryption key is not stored in the card-device 12.

These factors of remote user authentication may be used and combined in a number of different ways. The options described above are illustrative only.

The authentication logic 51 is customized to a security application enabling different degrees of remote user authentication from multiple factors, wherein the authentication may be based on any two or any three or all four factors of authentication in a specific application.

The authentication logic 51 resident in the server 50 receives multiple factors of authentication from a network interface 15 from a remote user and may apply a weighted priority logic to the authentication factors, which enable dynamic multiple factors of authentication to be used in granting authentication to the remote user.

FIG. 4D illustrates the logic steps that may be used in the authentication logic 51. At step 140, the authentication logic 51 receives an authentication record from network I/F.

At step 142, the authentication logic 51 using card serial number finds the authentication record in the authentication database 52.

At step 144, the authentication logic 51 recreates the encryption key from the PIN and the card specific algorithm that are pre-stored in the authentication database 52.

At step 146, the authentication logic 51 decrypts the authentication record using the encryption key.

At step 148, the authentication logic 51 checks the factor flags that are on/off for an application.

At step 150, the authentication logic verifies the authentication factors in the record against the pre-stored data for those factors.

At step 152, the authentication logic 51, if comparisons pass, send authentication successful message to the network device 15.

The database 52 stores the weight for each factor, that enable some factors to be on and some factors to be off. This enables those factors that are on to be used and those factors that are off to not be used. Some factors may be weighted in a 0 to 100% scale. The weighting of the authentication factors allows an optimum authentication to be used for the specific authentication security needs for a specific application in a specific environment.

As a simplified illustration, ATMs that are used for customers and where the dollar loss may be limited, a two-factor authentication is applicable, whereas, in a financial transaction network where businesses move large amount of funds, a three- factor authentication for the business employees may be used. Hence remote user authentication security of persons who enable large financial transaction may be more stringent while using the same remote user authentication card-device 12.

In the authentication logic 51 means may be provided to disable one or more factors such as via an on/off flag for the thumbprint and on/off flag for the location. In addition, different weights may be assigned for the accuracy of the data of thumbprint and location. For example, the location may not be used if the card-device 12 is in an under-ground location where the GPS signal may not be received or the location is close but does not precisely match the location data stored in the database. As another example, the thumbprint may not be used if the remote user is in hostile environment and is wearing a glove. As yet another example, the PIN entry on the card-device 12 may not be used for the same reason, as long as other factors of authentication, such as card id and location are present.

Figure 6:
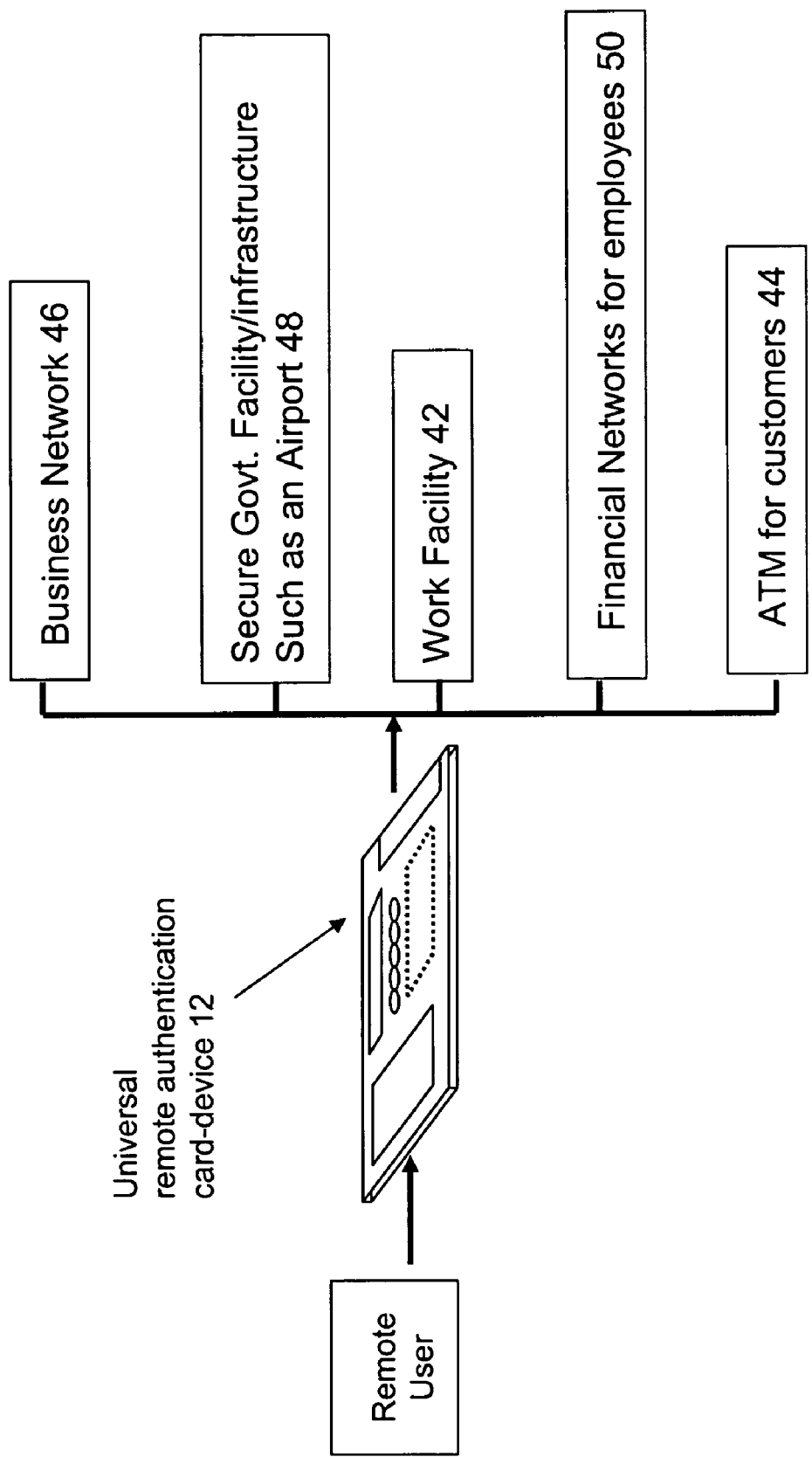
FIG. 6 shows the application of the device as a universal authentication device for networks such as financial ATM, business computer network, facility access, and other networks.

As illustrated in FIG. 6, while the card device 12 may be embedded with one or more features and may have all the features that allows it to act as a universal remote authentication card-device, the back-end authentication system and the authentication logic 51 may be different for each application. For example, one card-device 12 having all these features may be easier to mass manufacture for universal commonality and the same device may be used in an airport 48, in a work facility 42, in a financial transaction 50 or access to a computer network 46, while the back end authentication system and the authentication logic 51 is customized individually to the security needs of each system and application. For example, for ease of use only two factors may be used in some applications and while in other applications a different set of two or three factors may be used. In some high security applications all features may be used that may change dynamically within each high security application environment.

In brief, the card-device 12, serves to authenticate a remote user by multiple factors of authentication where a one card-device 12 alone is able to provide either a two-factor or a three-factor authentication, or even a four-factor remote user authentication without the use of a login window and without the use of a separate biometric sensor and provides enhanced security at a lower cost. The invention also discloses additional multiple means for security assurance, such as, use of a radio clock for identifying time of use, a time window, a calendar window, and use of PIN as an encryption key in the card-device.

While the particular method and apparatus as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

What is claimed is:

1. A remote user authentication device, comprising:
   a. a hand-held remote user authentication card-device with an interface and an embedded computer logic to interface the card-device to a network for a "what you have" factor of authentication including, at least, a card serial number;
   b. the card-device has a top side and a bottom side and has a thumbprint sensor positioned only on the top side of the card-device for when the card-device is held in a hand with only a thumb gripping the top side and the hand's index finger gripping the bottom side, the position of the thumbprint sensor on the card-device enables only the thumb to be naturally placed flat on the thumbprint sensor for capture of only a thumbprint of a card-device holder for a "what you are" factor of authentication;
   c. the embedded computer logic in the card-device with the interface transfers out an authentication record which contains separate "what you have" and the "what you are" factors of authentication, the card-device does not permanently store thumbprint identity data after the transfer to the network, and the card-device automatically functions as a two-factor remote user authentication device to the network.

2. The device as in claim 1, further comprising:
the card-device is in the form of a flat card, with the topside, the bottom side, a left edge and a right edge, wherein the interface is on the left edge, and the thumbprint sensor is on the topside and near the right edge.

3. The device as in claim 1, further comprising:
the logic and the interface transfer a card identification and the captured thumbprint to a network, for the card-device to function as a two factor authentication card-device.

4. The device as in claim 3, further comprising:
the logic begins thumbprint capture when card is interfaced with the network and not before and hold in the temporary memory of logic until the transfer to the network, whereby the card-device does not hold the thumbprint except for a brief moment in time.

5. The device as in claim 1, further comprising:
the device has a radio clock sensor and mechanism chip that computes the time of device use and transfers such time as part of an authentication record via the interface, to a network device, as a method of security assurance.

6. The device as in claim 1, further comprising:
the card-device has an embedded GPS function chip that enables the location of the card-device to be transferred out of the card-device as an additional "where you are" factor of authentication.

7. A remote user authentication device, comprising:
   a. a hand-held remote user authentication card-device with an interface and an embedded computer logic to interface the card-device to a network for a "what you have" factor of authentication including, at least, a card serial number;

b. the card-device has a data entry and display and a logic that enable entry of a PIN into a temporary memory of the logic for a "what you know" factor of authentication; and c. the embedded computer logic enable the card-device, via the interface, to transfer out from the remote user authentication card-device an authentication record to a network which contains separate "what you have" and the "what you know" factors of authentication, the card-device does not permanently store a user's identity data after the transfer to the network, for the card-device to automatically function as a two-factor remote user authentication device to the network.

8. The device as in claim 7, comprising:
the logic and the interface transfer a card identification and the PIN to the network, for the card-device to function as a two-factor authentication card-device.

9. The device as in claim 7, the data entry comprising:
a plurality of electronic rotary switches that enable alpha-numeric entry of the PIN without a keypad.

10. The device as in claim 7, further comprising:
the logic embedded with a heuristic card-specific algorithm that transforms the temporary stored PIN to a temporary stored encryption key.

11. The device as in claim 10, the logic comprising:
the logic uses this encryption key to encrypt the card identification and transfers the data anchored by a card serial number via the interface to the network.

12. The device as in claim 7, further comprising:
the card-device has an embedded GPS function chip that enables the location of the card-device to be transferred out of the card-device as an additional "where you are" factor of authentication.

13. The device as in claim 7, further comprising:
the card-device has a radio clock sensor and mechanism chip that computes the time of card-device use and transfers the time via the interface to a network, as an additional method of security assurance.

14. A remote user authentication device, comprising:
a hand-held remote user authentication card-device that has an interface and has a computer logic;
the computer logic (i) first receives a PIN into a temporary memory, (ii) then converts the PIN into an encryption key in the temporary memory and deletes the PIN, (iii) and then using the encryption key encrypts an authentication record in the card-device and saves in the temporary memory and then deletes the encryption key; and
the computer logic via the interface then transfers the encrypted authentication record out of the card-device to a network device for authentication, such that the card-device does not permanently retain identity data information in the authentication record that may be subject to compromise from the card-device after the transfer to the network.

15. The device as in claim 14, comprising:
the logic uses a card specific algorithm to convert the PIN into a card-specific encryption key.

16. A method of remote user authentication, comprising the steps of:
a. enabling entering, first a PIN in a hand-held remote user authentication card-device and saving the PIN into a temporary memory of the card-device by a computer logic in the card-device;
b. converting then by the computer logic the PIN into an encryption key in the temporary memory using a card-device specific algorithm and then deleting the PIN; and
c. encrypting then by the computer logic an authentication record in the card-device using the encryption key, saving the encrypted authentication record in the temporary memory and then deleting the encryption key; and
d. transferring then by the computer logic the encrypted authentication record from the card-device to a network device via an interface in the card-device, such that the card-device does not permanently retain identity data information in the authentication record that may be subject to compromise from the card-device after the transfer to the network.

17. The method as in claim 16, comprising the steps of:
a. receiving the encrypted authentication record by an authentication server connected to the network device;
b. recreating the encryption key by the authentication server from the PIN and the card specific algorithm pre-stored in an authentication database;
c. decrypting the encrypted authentication record by the authentication server using the encryption key;
d. verifying the authentication record with pre-stored data in the authentication database.

18. A remote user authentication device, comprising:
a. a hand-held remote user authentication card-device with an interface and an embedded computer logic that provides a card serial number and an encrypted card identification;
b. the card-device has a data entry and a display and a logic that enable entry of a PIN into a temporary memory of the logic for a limited time;
c. the card-device has a top side and a bottom side and has a thumbprint sensor positioned only on the top side of the card-device for when the card-device is held in a hand with only a thumb gripping the top side and the hand's index finger gripping the bottom side, the position of the thumbprint sensor on the card-device enables only the thumb to be naturally placed flat on the thumbprint sensor for capture by a capture logic of only a thumbprint of a card-device holder in the temporary memory;
d. the logic and the interface, interface the card-device to a network to transfer out of the card-device an authentication record which contains the card serial number and separate factors of authentication of, (i) the encrypted card identification for a "what you have" factor of authentication, (ii) the PIN for a "what you know" factor of authentication, and (iii) the thumbprint, for a "what you are" factor of authentication, the card-device does not permanently store identity data after the transfer to the network and the card-device automatically functions as a three-factor authentication device to the network.

19. The device as in claim 18, further comprising:
the device adapted with an embedded GPS chip enabling the location of the device to be used as an additional "where you are" factor of authentication.

20. The device as in claim 18, further comprising:
the device has a radio clock sensor and mechanism chip that computes the time of device use and transfers such time via the interface to a network, as an additional method of security assurance.

21. The device as in claim 18, further comprising:
the device adapted with an RFID mechanism chip that identifies the device by a serial number, wherein the device may be tracked for location when entering and leaving controlled areas.

22. The device as in claim 18, comprising:
the interface is from a group of, wired, optical, and short distance wireless.

* * * * *